US012683223B2

(12) United States Patent
Rhee et al.

(10) Patent No.: US 12,683,223 B2
(45) Date of Patent: Jul. 14, 2026

(54) BATTERY MODULE WITH IMPROVED STABILITY

(71) Applicant: SK Innovation Co., Ltd., Seoul (KR)

(72) Inventors: Seo Roh Rhee, Daejeon (KR); Sol San Son, Daejeon (KR); Ha Chul Jeong, Daejeon (KR); Seung Hoon Ju, Daejeon (KR); Yang Kyu Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 214 days.

(21) Appl. No.: 17/144,838

(22) Filed: Jan. 8, 2021

(65) Prior Publication Data

US 2021/0218099 A1 Jul. 15, 2021

(30) Foreign Application Priority Data

Jan. 10, 2020 (KR) ........................ 10-2020-0003820

(51) Int. Cl.
*H01M 50/211* (2021.01)
*H01M 10/0525* (2010.01)
*H01M 10/653* (2014.01)
*H01M 10/6554* (2014.01)

(52) U.S. Cl.
CPC ..... *H01M 50/211* (2021.01); *H01M 10/0525* (2013.01); *H01M 10/653* (2015.04); *H01M 10/6554* (2015.04)

(58) Field of Classification Search
CPC .......................... H01M 50/211; H01M 10/653
See application file for complete search history.

(56) References Cited

U.S. PATENT DOCUMENTS

| | | | | |
|---|---|---|---|---|
| 8,785,026 | B2 * | 7/2014 | Hu | ...................... H01M 10/617 |
| | | | | 429/120 |
| 2011/0159340 | A1 | 6/2011 | Hu et al. | |
| 2012/0114990 | A1 * | 5/2012 | Jeong | .................. H01M 50/231 |
| | | | | 429/163 |
| 2012/0270042 | A1 * | 10/2012 | Hanai | .................. C09J 133/066 |
| | | | | 428/355 AC |

(Continued)

FOREIGN PATENT DOCUMENTS

| | | |
|---|---|---|
| CN | 110431710 A | 11/2019 |
| JP | 2007-184392 A | 7/2007 |

(Continued)

OTHER PUBLICATIONS

Sheen: SH600 Foam Silicon, https://www.sheenthermal.com/sh600-foam-silicone.html, Dec. 10, 2019, 12 pgs (Year: 2019).*

(Continued)

*Primary Examiner* — Alix E Eggerding
(74) *Attorney, Agent, or Firm* — IP & T GROUP LLP

(57) ABSTRACT

A battery module which may prevent or delay a short circuit with respect to nail penetration includes a cell assembly including a plurality of cells electrically connected to each other, an outer case of the battery module, covering the cell assembly, and an elastic refractory part provided in a region between the outer case of the battery module and an outermost cell of the cell assembly or a region between one of the cells and an adjacent cell in the battery module, wherein the elastic refractory part includes an elastic layer and a heat conductive layer.

5 Claims, 2 Drawing Sheets

HEAT TRANSFER PATH

HEAT TRANSFER THROUGH THERMAL ADHESIVE

HEAT TRANSFER THROUGH COOLING PLATE

(56) References Cited

U.S. PATENT DOCUMENTS

| | | | |
|---|---|---|---|
| 2013/0065011 A1* | 3/2013 | Suzuki | H01L 23/433 |
| | | | 428/492 |
| 2016/0276632 A1* | 9/2016 | Park | H01M 50/105 |
| 2019/0020079 A1* | 1/2019 | Lee | H01M 10/613 |
| 2020/0152932 A1 | 5/2020 | Ozawa et al. | |

FOREIGN PATENT DOCUMENTS

| | | | |
|---|---|---|---|
| JP | 2012-106480 A | 6/2012 |
| JP | 2014-060012 A | 4/2014 |
| JP | 2019-117784 A | 7/2019 |
| KR | 10-2013-0122550 A | 11/2013 |
| KR | 10-2015-0037392 A | 4/2015 |
| KR | 10-2015-0038931 A | 4/2015 |
| KR | 10-2017-0029283 A | 3/2017 |

OTHER PUBLICATIONS

Office Action for Korean Patent Application No. 10-2020-0003820 issued by the Korean Patent Office on Nov. 26, 2024.
Office Action for Chinese Patent Application No. 202110023701.7 issued by the Chinese Patent Office on Apr. 8, 2025.
Office Action for Korean Patent Application No. 10-2020-0003820 issued by the Korean Patent Office on Aug. 8, 2025.

* cited by examiner

HEAT TRANSFER PATH

HEAT TRANSFER THROUGH
THERMAL ADHESIVE

HEAT TRANSFER THROUGH
COOLING PLATE

BATTERY MODULE WITH IMPROVED STABILITY

CROSS-REFERENCE TO RELATED APPLICATION(S)

This application claims benefit of priority to Korean Patent Application No. 10-2020-0003820 filed on Jan. 10, 2020 in the Korean Intellectual Property Office, the disclosure of which is incorporated herein by reference in its entirety.

BACKGROUND

1. Field

The present disclosure relates to a battery module.

2. Description of Related Art

Example embodiments of the present disclosure relate to a battery module having improved stability which may prevent and delay a short circuit in the case of nail penetration.

In a battery mounted on a vehicle, and the like, a content of nickel has been increased to increase energy density of a battery, and accordingly, a thin film container having a thickness of about 0.15 mm may be used as an exterior material of a pouch cell in the battery module.

In relation to the development direction of such a battery, when a short circuit occurs due to an impact on the battery, a problem such as ignition of the battery may occur. Thus, measures to ensure stability of a battery have been necessary.

Generally, a voltage and temperature sensor may be used to secure stability against a short circuit occurring in a system unit. However, when a metallic nail penetrates an outer case of a battery module, issues such as ignition due to a short circuit may occur. There has been no solution to prevent a short circuit in penetration in a battery module unit to date.

In a battery mounted on a vehicle, and the like, when a metallic nail 4 penetrates an outer case 3 of the battery module and penetrates into a cell 1 as illustrated in FIG. 1, an internal short circuit may occur, which may cause ignition.

Thus, there has been strong demand for development of a technique for securing stability of a battery by preventing a short circuit caused by penetration in a battery module unit.

SUMMARY

An example embodiment of the present disclosure is to provide a technique of preventing and delaying ignition by preventing an internal short circuit of a cell in penetration in relation to a high-voltage battery module.

According to an example embodiment of the present disclosure, a battery module which may prevent or delay a short circuit with respect to nail penetration includes a cell assembly including a plurality of cells electrically connected to each other, an outer case of the battery module, covering the cell assembly, and an elastic refractory part provided in a region between the outer case of the battery module and an outermost cell of the cell assembly or a region between one of the cells and an adjacent cell in the battery module, wherein the elastic refractory part includes an elastic layer and a heat conductive layer.

The cell may be a pouch-type lithium secondary battery.

The elastic layer may be formed of at least one selected from a group consisting of silicone, latex, polyurethane, and natural rubber.

The elastic layer may have an elongation rate of 50% or higher.

The heat conductive layer may have a thermal conductivity of 0.5 to 500 W/m·K.

The heat conductive layer may include graphite.

Each of the elastic layer and the heat conductive layer may have a thickness of 9 μm to 3 mm independently.

The heat conductive layer may have a heat transmission coefficient of $5 \times 10^3$ W/m²·K or higher.

The elastic layer and the heat conductive layer may be laminated or bonded by an adhesive layer.

The adhesive layer may be a double-sided tape including at least one adhesive selected from a group consisting of acrylic, silicone, rubber, and epoxy.

The elastic refractory part may have a thickness of 30 μm to 5 mm.

In the elastic refractory part provided between the outer case of the battery module and the outermost battery cell of the cell assembly, the elastic layer may be adjacent to the cell assembly.

The battery module may include a cooling plate, and the elastic refractory part is connected to the cooling plate.

The elastic refractory part may be connected to the cooling plate through a thermal adhesive.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present disclosure will be described as follows with reference to the accompanying drawings.

The present disclosure is to provide a battery module including an elastic refractory part, which may also be referred to as a flame retardant elastic material, which may be provided between an outer case and cells on both ends, or, if necessary, provided between cells, and the elastic refractory part may prevent an internal short circuit of a cell by enclosing a metal nail when the nail penetrates into the battery module.

In the present disclosure, the elastic refractory part is not limited to the above-described example, and the elastic refractory part may be applied to a pouch-type lithium ion secondary battery cell in which a plurality of unit cells having a negative electrode, a positive electrode, and a separator interposed between the negative electrode and the positive electrode may be stacked, and may be inserted into a pouch, and a cell assembly in which a plurality of cells are stacked and electrically connected.

Figure 1:
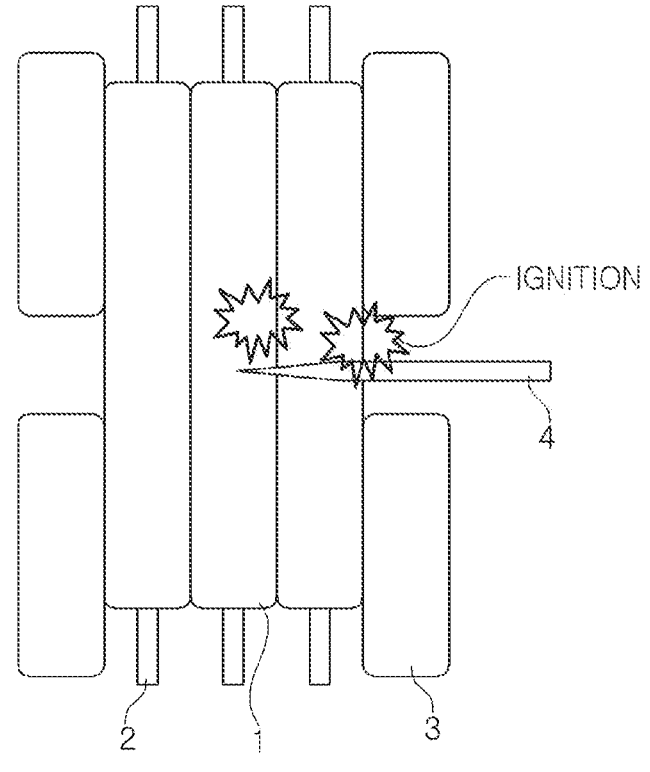
FIG. 1 is a diagram illustrating ignition occurring in nail penetration in a general battery module.
Figure 2:
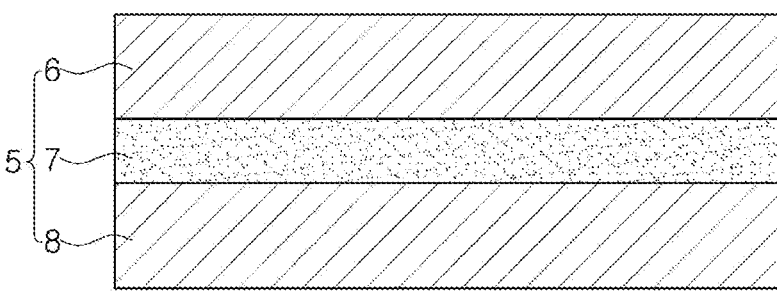
FIG. 2 is a diagram illustrating a cross-sectional surface of an elastic refractory part according to an example embodiment of the present disclosure.

The elastic refractory part provided in the example embodiment may have a multilayer structure including an elastic layer and a heat conductive layer, and may have a form of a film. FIG. 2 illustrates a cross-sectional structure of an example embodiment of the elastic refractory part. As illustrated in FIG. 2, the elastic refractory part 5 in the example embodiment may include an elastic layer 6 and a heat conductive layer 8, and an adhesive layer 7 may be disposed between the elastic layer 6 and the heat conductive layer 8.

Figure 3:
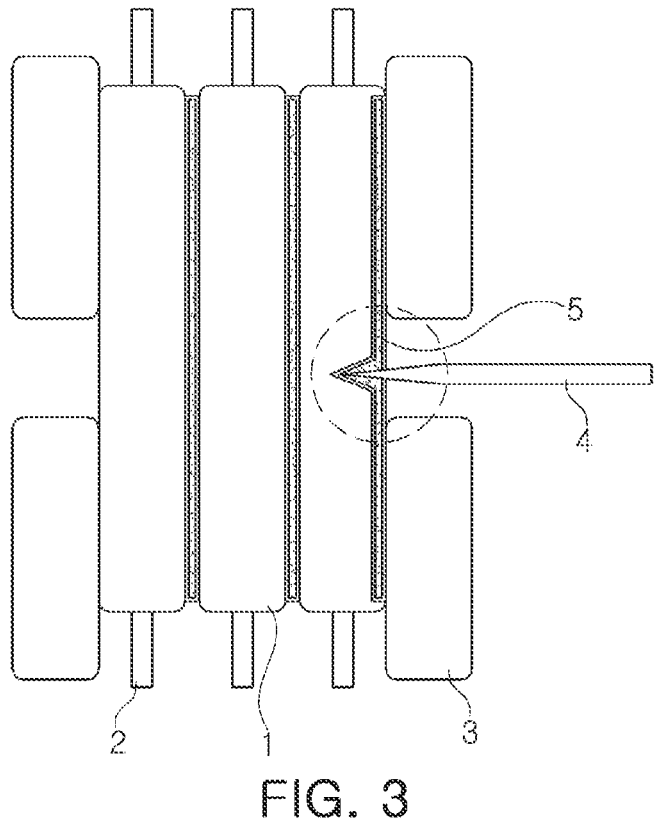
FIG. 3 is a diagram illustrating prevention of ignition in nail penetration in a battery module to which an elastic refractory part is applied according to an example embodiment of the present disclosure.

The elastic layer 6 may have elasticity, and as illustrated in FIG. 3, when a sharp material such as a metallic nail 4 penetrates an outer case 3 of the battery module and is in contact with the cell, the elastic layer 6 may expands while enclosing a point of the nail such that the nail may not penetrate into the cell 1, and the elastic layer 6 may prevent a pouch of the cell 1 from being pierced in the penetration.

The elastic layer 6 may have insulating properties and/or heat resistance. When the elastic layer 6 has insulation properties, even when a metallic nail penetrates into the cell 1, the elastic layer 6 may work as a separator between the cells 1 such that an internal short circuit of the cell 1 may be prevented, thereby preventing or delaying ignition. Also, when the elastic layer 6 has heat resistance, even when heat is generated or ignition occurs, the function of the elastic layer 6 may be maintained.

To this end, an elongation rate of the elastic layer 6 may be 50% or higher, and more preferably, less than 1000%. When the elongation rate is less than 50%, the elastic layer 6 may not elongate to the cell along with the penetrating nail.

The elastic layer 6 may have a thickness of 9 $\mu$m to 3 mm. When the thickness of the elastic layer is less than 9 $\mu$m, the layers may not be laminated to each other, and when the thickness exceeds 3 mm, the elastic layer may not elongate.

The elastic layer 6 may be formed of a material having excellent ductility, such as silicone, latex, polyurethane, or natural rubber, and more preferably, silicone having heat resistance and insulation properties along with elasticity. The elastic layer 6 may be configured as a single layer, or two or more elastic layers 6 may be stacked.

Figure 4:
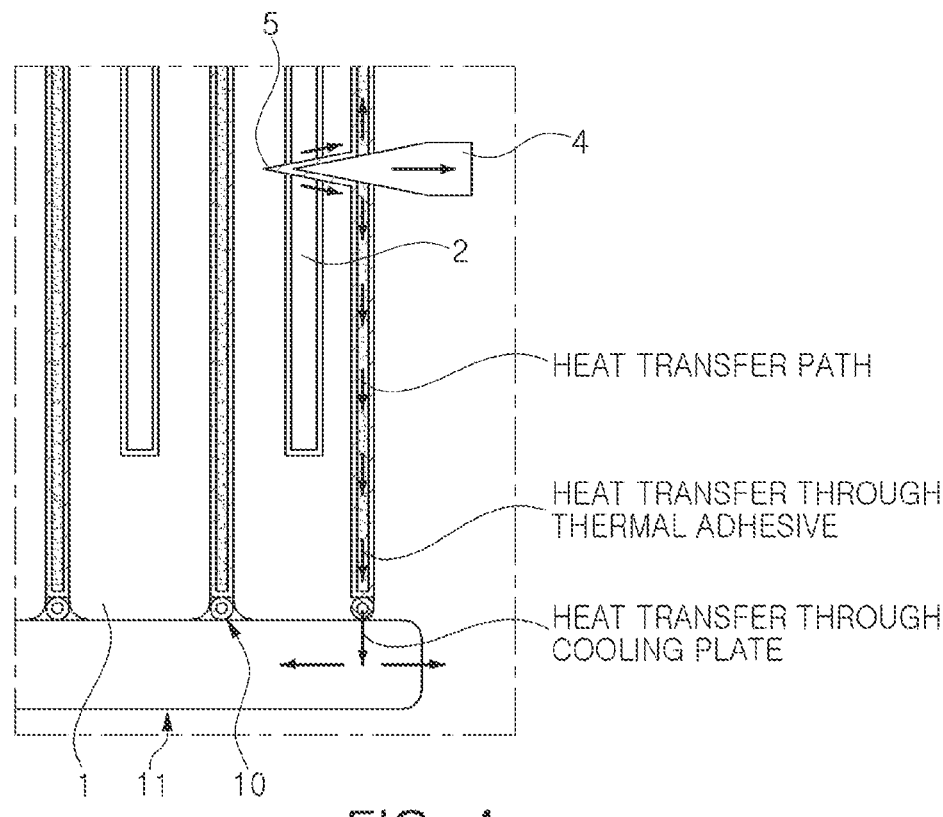
FIG. 4 is a diagram illustrating a heat transfer mechanism in nail penetration in a battery module to which an elastic refractory part is applied according to an example embodiment of the present disclosure.

When the cell 1 is short-circuited, the heat conductive layer 8 may discharge heat generated from the cell 1, thereby preventing an increase in temperature of the cell 1. Specifically, as illustrated in FIG. 4, the heat conductive layer 8 may work as a moving path (the arrow) for transferring heat generated from the battery, and may move heat to a thermal adhesive 10 and a cooling plate 11 of the battery module, thereby preventing an increase of temperature of the cell effectively.

To this end, the heat conductive layer 8 may have a thermal conductivity of 0.5 to 500 W/m·K. When the thermal conductivity is less than 0.5 W/m·K, it may be difficult to obtain a sufficient heat dissipation effect. When the thermal conductivity exceeds 500 W/m·K, there may be variation in cooling between the cells depending on whether an elastic refractory part is provided. Due to the variation in cooling between the cells, the effect of improving cell performance obtained by heat dissipation may not be sufficiently ensured.

The heat conductive layer 8 may have a thickness of 9 $\mu$m or greater and less than 3 mm. When the thickness of the heat conductive layer 8 is less than 9 $\mu$m, lamination may be difficult, and heat conduction may not occur effectively. As a material of the heat conductive layer 8, a material containing graphite may be used.

The heat conducive layer 8 may have a heat transmission coefficient of 5000 W/m²·K or higher, $5 \times 10^3$ to $5.5 \times 10^7$ W/m²·K, for example, in consideration of a thickness thereof.

The elastic layer 6 and the heat conductive layer 8 may be laminated to each other or may be bonded to each other by an adhesive layer 7. As the adhesive layer 7, a material which may bond the two layers to each other may be used, and a double-sided tape having an adhesive on both sides thereof may be used, or an inorganic double-sided tape formed of only the adhesive layer 7 may be used.

The adhesive layer 7 may have a shear strength of 300 kgf/in² or greater (measured by attaching the adhesive layer to an SUS substrate after removing a release paper at room temperature according to ASTM D5656). It may be preferable for the adhesive layer 7 to have a higher shear strength, and an upper limit thereof is not limited to any particular example. For example, the adhesive layer 7 may have a shear strength value of 30 kgf/in² or less.

An adhesive included in the adhesive layer 7 may, even when the separator between the cells 1 is torn, the elastic refractory part 5 may be adhered to the penetrating nail by an adhesive element such that the adhesive layer 7 may work as a separator.

As the adhesive layer 7, acrylic, silicone, rubber, epoxy, or the like, may be used, for example, and when the adhesive layer 7 has a base, as the base, a film formed of PET, polyimide, fluoropolymer, PVC, or the like, may be used, or a base having a form of foam, nonwoven, filament, fabric, or the like, may be used, for example.

The elastic refractory part 5 in the example embodiment may have a laminate structure of the elastic layer 6/the adhesive layer 7/the heat conductive layer 8 as illustrated in FIG. 2. By having the structure, even when the penetrating nail 4 penetrates into the battery module, the elastic layer 6 may elongate to perform a function as a separator such that a short circuit may be prevented, and further, when heat is generated due to a short circuit of the cell 1, heat may be transferred by the heat conductive layer 8 and may be discharged externally of the cell 1.

In the elastic refractory part 5, a single elastic layer 6 and a single heat conductive layer 8 may be included, or two or more of the elastic layer 6 and the heat conductive layer 8 may be included, and the elastic layer 6 and the heat conductive layer 8 may be disposed symmetrically. Further, depending on a shape and requirements of the battery module, an additional layer may be further included in addition to the example embodiment described above.

The elastic refractory part 5 in the example embodiment may have a total thickness of 30 $\mu$m to 5 mm. When the thickness of the elastic refractory part is less than 30 $\mu$m, expansion and heat conduction may not be effectively performed, and when the thickness of the elastic refractory part exceeds 5 mm, a distance between cells may increase, such that heat transfer to an aluminum plate (in the direction of a surface of the elastic refractory part) may not be effective, and there may be a difficulty in forming a bus bar.

The elastic refractory part 5 in the example embodiment may be installed on overall surfaces of the battery module, and is not limited to the aforementioned example embodiment. For example, the elastic refractory part 5 may be installed in a direction parallel to an electrode surface of the cell assembly, or may be installed on a surface on which an electrode tab 2 is disposed.

The elastic refractory part 5 may be installed between the outer case 3 of the battery module and the cell 1, that is, a pouch for accommodating the cell 1, or may be installed between one of the plurality of cells 1 and a cell 1 adjacent to the cell 1, between one of the cells 1 and an adjacent cell 1, for example, that is, between pouches. As an example embodiment, the elastic refractory part 5 may be installed in a position disposed between pouches, to which a double coated tape (not illustrated) or a pad (not illustrated) is attached. The elastic refractory part 5 may be installed in a single position, or in two or more positions.

By installing the elastic refractory part 5 of the example embodiment in the battery module, when a sharp material such as the nail 4 penetrates into the outer case 3 of the battery module, the elastic refractory part 5 may be changed to enclose the penetrating nail 4 by the elastic layer 6 such that the elastic refractory part 5 may work as a separator between the cells 1, and accordingly, an internal short circuit of the cell 1 may be prevented such that ignition may be prevented or delayed.

Also, when abnormal heat is generated in the battery by the nail 4 penetrating into the pouch, the elastic refractory part 5 may work as a heat transfer path for transferring heat by the heat conductive layer 8, thereby effectively discharging heat.

According to the aforementioned example embodiment, an internal short circuit may be prevented and delayed by protecting the cells in penetration in a high-voltage battery module.

Also, the ignition of cells in penetration in the high-voltage battery module may be prevented and delayed. While the example embodiments have been illustrated and described above, it will be apparent to those skilled in the art that modifications and variations could be made without departing from the scope of the present disclosure as defined by the appended claims.

What is claimed is:

1. A battery module, comprising:
   a cell assembly including a plurality of cells electrically connected to each other;
   an outer case of the battery module, covering the cell assembly; and
   a plurality of elastic refractory parts provided in two regions between the outer case of the battery module and an outermost cell of the cell assembly, and a region between one of the cells and an adjacent cell in the battery module,
   wherein the elastic refractory parts have a thickness of 30 $\mu$m to 5 mm and include an elastic layer and a heat conductive layer, wherein each of the elastic layer and the heat conductive layer has a thickness of 9 $\mu$m to 3 mm independently,
   wherein, in the elastic refractory parts provided between the outer case of the battery module and the outermost battery cells of the cell assembly, each elastic layer is adjacent to and in direct physical contact with an outer surface of each of the outermost battery cells,
   wherein the elastic layer has an elongation rate of 50% or higher,
   wherein the battery module includes a cooling plate,
   wherein the elastic refractory parts are connected to the cooling plate through a thermal adhesive,
   wherein the elastic layer and the heat conductive layer are bonded by an adhesive layer, the adhesive layer has a shear strength of 300 kgf/in$^2$ or greater as measured by attaching the adhesive layer to an SUS substrate after removing a release paper at room temperature according to ASTM D5656,
   wherein the adhesive layer includes a base film comprising at least one selected from the group consisting of PET, polyimide, fluoropolymer, and PVC, and an adhesive disposed on the base film and comprising at least one selected from the group consisting of acrylic, silicone, rubber, and epoxy, and
   wherein the heat conductive layer has a heat transmission coefficient of 5×10$^3$ W/m$^2$·K to 5.5×10$^7$ W/m$^2$·K.

2. The battery module of claim 1, wherein the cell is a pouch-type lithium secondary battery.

3. The battery module of claim 1, wherein the elastic layer is formed of at least one selected from a group consisting of silicone, latex, polyurethane, and natural rubber.

4. The battery module of claim 1, wherein the heat conductive layer has a thermal conductivity of 0.5 to 500 W/m·K.

5. The battery module of claim 1, wherein the heat conductive layer includes graphite.

* * * * *